United States Patent [19]
Hoenig et al.

[11] Patent Number: 5,849,418
[45] Date of Patent: Dec. 15, 1998

[54] GASKETS MADE FROM HOMOGENEOUS LINEAR OLEFIN POLYMERS

[75] Inventors: Steve M. Hoenig, Lake Jackson, Tex.; Edward E. Greene, Midland, Mich.

[73] Assignee: The Dow Chemical Company, Midland, Mich.

[21] Appl. No.: 551,659

[22] Filed: Nov. 1, 1995

Related U.S. Application Data

[63] Continuation of Ser. No. 392,287, Feb. 22, 1995, abandoned, which is a continuation of Ser. No. 108,855, Aug. 18, 1993, abandoned.

[51] Int. Cl.$^6$ ................................................ B32B 27/32
[52] U.S. Cl. ..................... 428/500; 428/515; 428/516; 428/523; 428/441; 428/483; 215/341; 215/DIG. 2; 215/DIG. 4
[58] Field of Search ..................................... 428/500, 523, 428/515, 516, 441, 483; 215/341, DIG. 2, DIG. 4; 525/191, 240; 526/72, 348, 352, 352.2, 943

[56] References Cited

U.S. PATENT DOCUMENTS

| | | |
|---|---|---|
| 2,717,025 | 9/1955 | Jelinek . |
| 2,827,192 | 3/1958 | Warth . |
| 3,134,496 | 5/1964 | Kehe . |
| 3,164,485 | 1/1965 | Nagle et al. . |
| 3,183,144 | 5/1965 | Caviglia . |
| 3,300,072 | 1/1967 | Caviglia . |
| 3,414,938 | 12/1968 | Caviglia . |
| 3,493,453 | 2/1970 | Ceresa et al. . |
| 3,645,992 | 2/1972 | Elston et al. ........................ 260/80.78 |
| 3,779,965 | 12/1973 | Lefforge et al. . |
| 3,786,954 | 1/1974 | Shull ...................................... 215/341 |
| 4,085,186 | 4/1978 | Rainer .................................... 264/268 |
| 4,198,369 | 4/1980 | Yoshikawa et al. .................. 264/268 |
| 4,619,848 | 10/1986 | Knight et al. ......................... 220/228 |
| 4,717,034 | 1/1988 | Mumford ............................... 215/318 |
| 4,807,772 | 2/1989 | Schloss .................................. 215/349 |
| 4,846,362 | 7/1989 | Schloss .................................. 215/349 |
| 4,949,859 | 8/1990 | Bayer ..................................... 215/341 |
| 4,981,231 | 1/1991 | Knight .................................... 215/341 |
| 4,984,703 | 1/1991 | Burzynski ............................. 215/350 |
| 5,001,205 | 3/1991 | Hoel ....................................... 526/128 |
| 5,104,710 | 4/1992 | Knight .................................... 428/66 |
| 5,137,164 | 8/1992 | Bayer ..................................... 215/352 |
| 5,211,974 | 5/1993 | White ..................................... 426/106 |
| 5,215,587 | 6/1993 | McConnellogue et al. ........... 118/699 |
| 5,272,236 | 12/1993 | Lai et al. ............................. 526/348.5 |
| 5,278,272 | 1/1994 | Lai et al. ............................. 526/348.5 |

*Primary Examiner*—Marie Yamnitzky

[57] ABSTRACT

Gaskets comprising at least one homogeneous linear ethylene polymer are disclosed. The gaskets are particularly useful for sealing beverage containers and do not contribute to taste and/or odor of the packaged product, which is especially useful in food-stuff applications.

11 Claims, No Drawings

GASKETS MADE FROM HOMOGENEOUS LINEAR OLEFIN POLYMERS

CROSS REFERENCE TO RELATED APPLICATIONS

This application is a continuation of U.S. Ser. No. 08/392,287, filed Feb. 22, 1995, now abandoned, which was a continuation of U.S. Ser. No. 08/108,855, filed Aug. 18, 1993, now abandoned.

FIELD OF THE INVENTION

This invention relates to gaskets made from homogeneous linear olefin polymers. The gaskets are capable of compression sealing various containers, without contaminating the contents. Liquid containers particularly benefit from the use of the novel gasketing materials disclosed herein.

BACKGROUND OF THE INVENTION

Gaskets have been made from a variety of structural materials, including polymers such as ethylene/vinyl acetate (EVA) and polyvinyl chloride (PVC). For example, U.S. Pat. No. 4,984,703 (Burzynski) discloses plastic closures which have a sealing liner comprising a blend of ethylene/vinyl acetate and a thermoplastic elastomeric composition.

Depending on the use environment, gaskets can have varying degrees of properties. For example, in corrosive service conditions, the gasket must be impervious to the material in question, but still resilient enough to form a seal. Gaskets used in the food and beverage area have similar requirements, but cannot contaminate the foodstuff. Furthermore, depending upon the type of food and/or liquid contents, the filling temperature might be lower or higher than room temperature, thus placing greater demands on the gasket.

Various attempts to solve these challenges usually involve the use of oil additives or elastomer additives.

For example, U.S. Pat. No. 5,137,164 (Bayer) discloses a method of lining a plastic closure to with a thermoplastic. The thermoplastic is a non-cross linked curable, vinyl chloride copolymer composition which has been plasticized with an epoxidized oil, an organic diglycidyl ether and a curing agent for the ether.

U.S. Pat. No. 4,807,772 (Schloss) and U.S. Pat No. 4,846,362 (Schloss) disclose polypropylene and polyethylene closures, respectively, each having removable liners made from a blend of polyethylene and a thermoplastic, elastomeric copolymer (such as a block copolymer of styrene and butadiene). The blends are said to generally include 20–50 weight percent oil.

Polyethylene also has been disclosed as useful for forming gasket liners, but has not been commercially successful to date, because the polymer is too "hard" and because by adding oil to reduce the hardness, the extractables increase, thus negating regulatory requirements for food contact. In addition, linear low polyethylene does not adhere well to polypropylene (which is often used as a closure material, as described in U.S. Pat. No. 4,807,772) resulting in a loose polyethylene gasket.

While there have been many different solutions to the problems of gasketing materials, especially those involving cap liners, most of these incorporated additives. We have now discovered homogeneous linear ethylene polymers useful in making gasket materials, without expensive additives and, in the case of foodstuff, without adversely contributing to the taste and/or odor of the product.

SUMMARY OF THE INVENTION

Gaskets comprising at least one homogeneous linear olefin polymer have now been discovered to have these often conflicting attributes. The homogeneous linear olefin polymers have an unusual combination of properties, making them especially useful for gasket materials. Preferably, the homogeneous linear olefin polymer is an ethylene polymer.

Gaskets comprising homogeneous linear ethylene polymers are especially preferred. A complete olefinic system (such as a gasket comprising the homogeneous linear ethylene polymer and a cap comprising a polypropylene polymer) can also be recycled together. Potential uses of the recycled polymers include melt spinning biconstituent fiber, as described in U.S. Pat. No. 5,133,917 (Jezic et al.), the disclosure of which is incorporated herein by reference.

DETAILED DESCRIPTION OF THE INVENTION

The term "linear olefin polymers" used herein means that the olefin polymer does not have long chain branching. That is, the linear olefin polymer has an absence of long chain branching, as for example the traditional linear low density polyethylene polymers or linear high density polyethylene polymers made using Ziegler polymerization processes (e.g., U.S. Pat. No. 4,076,698 (Anderson et al.) the disclosure of which is incorporated herein by reference,), sometimes called heterogeneous polymers. The term "linear olefin polymers" does not refer to high pressure branched polyethylene, ethylene/vinyl acetate copolymers, or ethylene/vinyl alcohol copolymers which are known to those skilled in the art to have numerous long chain branches. The term "linear olefin polymers" also refers to polymers made using uniform branching distribution polymerization processes, sometimes called homogeneous polymers. Such uniformly branched or homogeneous polymers include those made as described in U.S. Pat. No. 3,645,992 (Elston), the disclosure of which is incorporated herein by reference, and those made using so-called single site catalysts in a batch reactor having relatively high olefin concentrations (as described in U.S. Pat. No. 5,026,798 (Canich) or in U.S. Pat. No. 5,055,438 (Canich) the disclosures of which are incorporated herein by reference). The uniformly branched/homogeneous polymers are those polymers in which the comonomer is randomly distributed within a given interpolymer molecule and wherein substantially all of the interpolymer molecules have the same ethylene/comonomer ratio within that interpolymer, but these polymers too have an absence of long chain branching, as, for example, Exxon Chemical has taught in their February 1992 Tappi Journal paper.

The traditional homogeneous linear polymers have only a single melting point, as opposed to traditional Ziegler polymerized heterogeneous linear ethylene/α-olefin copolymers which have two or more melting points (determined using differential scanning calorimetry (DSC)).

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or as described in U.S. Pat. No. 4,798,081, the disclosure of which is incorporated herein by reference. The SCBDI or CDBI for the homogeneous linear olefin polymers of the present invention is preferably greater than about 30 percent, especially greater than about 50 percent.

The density of the ethylene or ethylene/α-olefin homogeneous linear ethylene polymers in the present invention is measured in accordance with ASTM D-792 and is generally from about 0.85 g/cm$^3$ to about 0.93 g/cm$^3$, preferably from about 0.9 g/cm$^3$ to about 0.92 g/cm$^3$, and especially from about 0.9 g/cm$^3$ to about 0.915 g/cm$^3$.

Melting point (and Vicat softening point) of the homogeneous linear ethylene polymers correlates primarily with the density of the polymer since the homogeneous linear ethylene polymers lack a high density (i.e., linear) fraction, with some effects attributable to the molecular weight of the polymer (indicated as melt index). Melting point variation of the homogeneous linear ethylene polymers is contrasted with heterogeneous ethylene polymers having two or more melting points (due to their broad branching distribution), one of which is about 126° C. and is attributable to the high density linear polyethylene fraction in the heterogeneous ethylene polymer. The lower the density of the homogeneous linear ethylene polymer, the lower the melting point. Some gaskets must withstand temperatures higher than room temperature (about 25° C.) for brief times, particularly where the applicaiton is a "hot fill" application. For example, products which must undergo pasteurization must have gaskets that have melting points greater than 100° C. Thus the homogeneous linear ethylene polymer can be selected specifically for the application in question by selecting the appropriate density for use in the gasket environment.

The molecular weight of the ethylene or ethylene/α-olefin homogeneous linear olefin polymers in the present invention is conveniently indicated using a melt index measurement according to ASTM D-1238, Condition 190° C./2.16 kg (formally known as "Condition (E)" and also known as I$_2$). Melt index is inversely proportional to the molecular weight of the polymer. Thus, the higher the molecular weight, the lower the melt index, although the relationship is not linear. The melt index for the ethylene or ethylene/α-olefin homogeneous linear olefin polymers used herein is generally from about 0.01 grams/10 minutes (g/10 min) to about 1000 g/10 min, preferably from about 1 g/10 min to about 100 g/10 min, and especially from about 10 g/10 min to about 50 g/10 min. Molecular weight, as indicated by the melt index, will be dependent upon the shear rate necessary to process the polymer into the gasket.

Another measurement useful in characterizing the molecular weight of the homogeneous linear olefin polymers is conveniently indicated using a melt index measurement according to ASTM D-1238, Condition 190° C./10 kg (formally known as "Condition (N)" and also known as I$_{10}$). The ratio of these two melt index terms is the melt flow ratio and is designated as I$_{10}$/I$_2$. As with the traditional Ziegler polymerized heterogeneous ethylene polymers, as the I$_{10}$/I$_2$ ratio of the homogeneous linear ethylene/α-olefin polymers correlates with the molecular weight distribution (M$_w$/M$_n$): as the I$_{10}$/I$_2$ increases, the M$_w$/M$_n$ also increases.

Other polymers can also be combined with effective amounts of the homogeneous linear ethylene polymers to make the gaskets as well, depending upon the end use properties required. These other polymers are thermoplastic polymers (i.e., melt processable) and include polymers such as highly branched low density polyethylene, heterogeneously branched linear low density polyethylene, ethylene/vinyl acetate copolymers, and ethylene/acrylic acid copolymers (e.g., Primacor™ Adhesive Polymers made by The Dow Chemical Company).

The gaskets made from the homogeneous linear ethylene polymers must be hard enough to withstand compression, but still soft enough such that an adequate seal is formed. Thus, the hardness of the polymer enables varying gaskets to be made, depending on the use. Hardness is measured herein as "Shore A" or "Shore D" hardness (as determined using ASTM D-2240). For the homogeneous linear ethylene polymers which comprise the gaskets, the Shore A hardness ranges from about 70 to about 100, even without the use of petroleum oils commonly included to reduce the hardness of the polymer and resulting gasket.

Additives such as antioxidants (e.g., hindered phenolics (e.g., Irganox® 1010 made by Ciba Geigy Corp.), phosphites (e.g., Irgafos® 168 made by Ciba Geigy Corp.)), cling additives (e.g., PIB), slip additives (e.g., erucamide), antiblock additives, pigments, and the like can also be included in the polyethylene compositions, to the extent that they do not interfere with the enhanced properties discovered by Applicants.

Molecular Weight Distribution Determination

The whole interpolymer product samples and the individual interpolymer samples are analyzed by gel permeation chromatography (GPC) on a Waters 150 C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968) to derive the following equation:

$$M_{polyethylene}=a*(M_{polystyrene})^b.$$

In this equation, a=0.4316 and b=1.0. Weight average molecular weight, M$_w$, is calculated in the usual manner according to the following formula: M$_w$=R w$_i$*M$_i$, where w$_i$ and M$_i$ are the weight fraction and molecular weight, respectively, of the i$^{th}$ fraction eluting from the GPC column.

The molecular weight distribution (M$_w$/M$_n$) for the homogeneous linear olefin polymers of the invention is generally from about 1.5 to about 2.5.

The homogeneous linear polymers of the present invention can be homopolymers of C$_2$–C$_{20}$ α-olefins, such as ethylene, propylene, 4-methyl-1-pentene, etc., or they can be interpolymers of ethylene with at least one C$_3$–C$_{20}$ α-olefin and/or C$_2$–C$_{20}$ acetylenically unsaturated monomer and/or C$_4$–C$_{18}$ diolefins. The homogeneous linear polymers of the present invention can also be interpolymers of ethylene with at least one of the above C$_3$–C$_{20}$ α-olefins, diolefins and/or acetylenically unsaturated monomers in combination with other unsaturated monomers.

Monomers usefully polymerized according to the present invention include, for example, ethylenically unsaturated monomers, acetylenic compounds, conjugated or nonconjugated dienes, polyenes, carbon monoxide, etc. Preferred monomers include the $C_2$–$C_{10}$ α-olefins especially ethylene, 1-propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclo-pentene, cyclo-hexene and cyclo-octene).

Other unsaturated monomers usefully polymerized according to the present invention include, for example, ethylenically unsaturated monomers, conjugated or nonconjugated dienes, polyenes, etc. Preferred monomers include the $C_2$–$C_{10}$ α-olefins especially ethylene, propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

Suitable Gasket Configurations

Gaskets can have many different forms, including "o-rings" and flat seals (e.g., "film-like" gaskets having a thickness commensurate with the intended use).

Suitable end uses include beverage cap liners, hot fill juice cap liners, polypropylene cap liners, metal cap liners, high density polyethylene cap liners, window glass gaskets, sealed containers, closure caps, gaskets for medical devices, filter elements, pressure venting gaskets, hot melt gaskets, easy twist off caps, electrochemical cell gaskets, refrigerator gaskets, galvanic cell gaskets, leak proof cell gaskets, waterproofing sheet, reusable gaskets, synthetic cork like materials, thin cell electromembrane separator, magnetic rubber materials, disc gaskets for alcoholic beverage bottle caps, freeze resistant seal rings, gaskets for plastic castings, expansion joints and waterstops, corrosion-resistant conduit connectors, flexible magnetic plastics, pipe joint seals, integral weatherproof plastic lid and hinge for electrical outlets, magnetic faced foamed articles, jar rings, flexible gaskets, glass seals, tamper evident sealing liners, pressure applicators, combined bottle cap and straw structures, large condiment bottle liners and the like.

Gaskets made from the homogeneous linear ethylene polymers have numerous advantages, especially when used in food-stuff applications. These include: improved taste and odor over incumbent polymer gaskets such as ethylene/vinyl acetate; low adhesion to polar substrates (e.g., polyethylene terephthalate, glass) which is useful for low torque removal of the closure/cap; low extractables (also useful for foodstuffs, especially regarding regulatory compliance); good adhesion to non-polar substrates (e.g., polypropylene and high density polyethylene (either linear homopolymer polyethylene or linear heterogeneous high density polyethylene)); adequate oxygen, carbon dioxide and water barrier; high melting point relative to incumbent polymers (e.g., ethylene/vinyl acetate); good stress crack resistance; good chemical resistance; and variable hardness (useful for specific packaging which may require more or less gasket stiffness, depending on the degree of torque required to seal the container and the internal pressure of the container).

Various gasket manufacturing techniques include those disclosed in U.S. Pat. No. 5,215,587 (McConnellogue et al.); U.S. Pat. No. 4,085,186 (Rainer); U.S. Pat. No. 4,619,848 (Knight et al.); U.S. Pat. No. 5,104,710 (Knight); U.S. Pat. No. 4,981,231 (Knight); U.S. Pat. No. 4,717,034 (Mumford); U.S. Pat. No. 3,786,954 (Shull); U.S. Pat. No. 3,779,965 (Lefforge et al.); U.S. Pat. No. 3,493,453 (Ceresa et al.); U.S. Pat. No. 3,183,144 (Caviglia); U.S. Pat. No. 3,300,072 (Caviglia); U.S. Pat. No. 4,984,703 (Burzynski); U.S. Pat. No. 3,414,938 (Caviglia); U.S. Pat. No. 4,939,859 (Bayer); U.S. Pat. No. 5,137,164 (Bayer); and U.S. Pat. No. 5,000,992 (Kelch). The disclosure of each of the preceding United States Patents is incorporated herein in its entirety by reference.

The gaskets claimed herein can also be made from extruded sheets or films by conventional techniques as blown, cast or extrusion coated films, followed by stamping or cutting the gasket from the sheet or film. Multilayer film structures are also suitable for making the gaskets disclosed herein, with the proviso that at least one layer (preferably the inner layer which is located adjacent to the product) comprises the homogeneous linear ethylene polymer.

We claim:

1. An article of manufacture comprising a non-polar cap having adhered thereto a gasket, which gasket in turn comprises at least one homogeneous linear ethylene polymer having an absence of long chain branching, wherein the at least one homogeneous linear ethylene polymer is a homopolymer of ethylene, an interpolymer of ethylene with at least one $C_3$–$C_{20}$ alpha-olefin, or a copolymer of ethylene with a $C_3$–$C_{20}$ alpha-olefin, and wherein the polymer has a composition distribution breadth index greater than 50 percent.

2. The article of manufacture of claim 1, wherein the homogeneous linear ethylene polymer has a molecular weight distribution, $M_w/M_n$, from about 1.5 to about 2.5.

3. The article of manufacture of claim 1, wherein the homogeneous linear ethylene polymer is characterized as having a Shore A hardness from about 70 to about 100.

4. The article of manufacture of claim 1, wherein the gasket further comprises a thermoplastic polymer selected from the group consisting of highly branched low density polyethylene, heterogeneously branched linear low density polyethylene, ethylene/vinyl acetate copolymers and ethylene/acrylic acid copolymers.

5. The article of manufacture of claim 1, wherein the gasket further comprises an additive selected from the group consisting of antioxidants, cling additives, slip additives, antiblock additives, and pigments.

6. The article of manufacture of claim 1, wherein the homogeneous linear ethylene polymer is produced using a single site catalyst.

7. The article of manufacture of claim 1, wherein the homogeneous linear ethylene polymer has a density of from 0.85 to 0.93 g/cm$^3$.

8. The article of manufacture of claim 1, wherein the homogeneous linear ethylene polymer has a melt index ($I_2$) of 1 g/10 min. to 100 g/10 min.

9. The article of manufacture of claim 1, further comprising a polar substrate to which the gasket is releasably retained.

10. The article of manufacture of claim 9, wherein the polar substrate comprises glass or polyethylene terephthalate.

11. The article of manufacture of claim 1, wherein the non-polar cap comprises polypropylene or high density polyethylene.

* * * * *